UNITED STATES PATENT OFFICE.

HARRY L. BELL, SR., OF PHILADELPHIA, PENNSYLVANIA.

PROCESS OF MAKING CUT-PRINTING PLATES.

951,521. Specification of Letters Patent. Patented Mar. 8, 1910.

No Drawing. Application filed July 20, 1909. Serial No. 508,662.

*To all whom it may concern:*

Be it known that I, HARRY L. BELL, Sr., a resident of Philadelphia, in the county of Philadelphia and State of Pennsylvania, have invented certain new and useful Improvements in Processes of Making Cut-Printing Plates; and I do hereby declare the following to be a full, clear, and exact description of the invention, such as will enable others skilled in the art to which it pertains to make and use the same.

This invention relates to processes of making news-paper-cut producing means.

The object of the invention is to provide an improved process for producing coarse line printing plates or surfaces adapted for news-paper or similar picture printing and giving fine line color effects.

The invention consists in the process hereinafter described and particularly pointed out in the claims.

This improved process is preferably carried out in the following manner. If, for example, a newspaper illustration is to include the likeness of a person, I form a photographic negative thereof through a fine screen, the negative being reduced to or made of a fractional part of the size of the cut desired, say to one half size. Owing to the use of a fine screen (that is, a screen having about 100 lines per inch, or more), the negative will give the desired shade and color effects to a greater extent than would a negative taken through a coarse line screen (that is, a screen having from 50 to 75 lines per inch). From this small or reduced, fine screen negative, by use of any suitable camera, I make an enlarged photographic copy, for example, on bromid paper or on velox paper, from which a second non-screen negative is made of the size of the desired illustration, and this because of the described enlargement will appear coarse lined but will retain the color effects of the fine screen negative, as above stated. The enlarged copy can be retouched, and when desired is given line effects manually with pen and ink as when the subject of the print is to become a part of a line drawing illustration, in which case the retouched print from the fine screen negative may be pasted in proper situation on the line drawing, and all reproduced by a camera, in one negative. Obviously copies of more than one object, produced in the manner described, could be attached to the same drawing and be simultaneously reproduced by a camera in a single negative, as frequently required in newspaper work. The negative from the enlarged copy is next reproduced on a sensitized metal to be etched and used directly; or from which a stereotype or electrotype plate is taken. In either case the final printing plate for the cut, which is the product of the described process, is coarse line, but retains the fine screen color effects of the first negative.

In some instances I first make the fine screen negative of the object (either reduced in size or not reduced, according to circumstances); then take a copy on paper (either velox or bromid) therefrom enlarged more than two times, by use of a suitable camera. The copy is then retouched, and therefrom by use of a suitable camera is made a second negative, reduced to the desired size for the cut, and to the required coarseness of line, and from the latter coarse line negative printing surfaces are prepared, as above indicated. Another way of carrying out the improvement is to make a half tone negative through a fine line screen, say 150 lines to the inch, and from such negative make a copy by contact, preferably on velox or bromid paper. Then from the copy make a negative, enlarged as required, and from this negative print on sensitized metal in any of the well known or suitable ways, and etch to finally form the plate.

I am aware that fine screen negatives have been enlarged directly onto printing plates, and this I do not claim.

Having thus described the invention what I claim is,—

1. The process of making a printing plate which consists in making a photographic negative through a fine screen, making a photographic copy therefrom, making a non-screen larger negative from such copy, and reproducing the second negative on a plate.

2. The process of making a printing plate which consists in making a photographic negative through a fine screen, making a photographic copy therefrom, retouching such copy, making a non-screen larger negative from such copy, and reproducing the second negative on a plate.

3. The process of making a printing plate which consists in making a reduced photographic negative through a fine screen, making an enlarged photographic copy from said negative, making a non-screen negative from such copy, and reproducing the second negative at the desired size of the illustration on a printing plate.

4. The process of making a printing plate which consists in making a photographic negative through a fine screen, making a copy thereof photographically on paper, making a non-screen larger negative from such copy, photographing the latter on a metal plate, and etching the latter.

5. The process of producing a printing plate comprising the making of a photographic negative of a subject through a fine screen, making a photographic copy thereof, associating such copy in desired relation with other matter, making a non-screen negative including the whole and in which the portion showing said copy is larger than the first negative, and reproducing the second negative without a screen on a printing plate.

6. The process of producing a printing plate comprising the making of a photographic negative through a fine screen and smaller than the desired plate, making an enlarged photographic copy thereof, associating such copy in desired relation with other matter, making a non-screen negative including the whole and in which the portion showing said copy is larger than the first negative, transferring the latter negative to a sensitized surface, and etching, as set forth.

In testimony whereof, I have signed this specification in the presence of two subscribing witnesses.

HARRY L. BELL, Sr.

Witnesses:
WILLIAM R. JONES,
JOHN R. HOFFMAN.